United States Patent [19]

Hunter

[11] 4,432,494
[45] Feb. 21, 1984

[54] SELF-STEERABLE WHEEL ASSEMBLY FOR IRRIGATION SYSTEMS

[76] Inventor: Richard E. Hunter, 5755 Arrowhead Dr., Greeley, Colo. 80631

[21] Appl. No.: 243,437

[22] Filed: Mar. 13, 1981

[51] Int. Cl.³ ............................................... B05B 3/18
[52] U.S. Cl. ............................. 239/177 CC; 239/184; 239/710; 239/711; 239/719; 239/DIG. 1
[58] Field of Search ............... 239/177, 178, 184, 710, 239/711, 719–721, DIG. 1

[56] References Cited

U.S. PATENT DOCUMENTS

| | | | |
|---|---|---|---|
| 2,800,364 | 7/1957 | Dick et al. | 239/721 |
| 3,220,654 | 11/1965 | Purtell | 239/721 |
| 3,281,080 | 10/1966 | Hogg | 239/212 |
| 3,352,493 | 11/1967 | Curtis | 239/177 |
| 3,381,893 | 5/1968 | Smith, Jr. et al. | 239/1 |
| 3,539,107 | 11/1970 | Mitchell | 239/177 |
| 3,606,160 | 9/1971 | Bonds et al. | 239/212 |
| 3,608,826 | 9/1971 | Reinke | 239/177 |
| 3,613,703 | 10/1971 | Stout | 137/1 |
| 3,703,990 | 11/1972 | Erickson | 239/11 |
| 3,797,517 | 3/1974 | Kircher et al. | 137/344 |
| 3,802,627 | 4/1974 | Seckler et al. | 239/212 |
| 3,901,442 | 8/1975 | Chapman | 239/99 |
| 3,902,668 | 9/1975 | Daugherty et al. | 239/177 |
| 4,172,551 | 10/1979 | Johnson | 239/711 |
| 4,228,955 | 10/1980 | Petersen | 239/177 |
| 4,232,705 | 11/1980 | Hait | 239/177 |

FOREIGN PATENT DOCUMENTS 181436  6/1966  U.S.S.R. ............................... 239/721

Primary Examiner—John J. Love
Assistant Examiner—Michael J. Forman
Attorney, Agent, or Firm—John E. Reilly

[57] ABSTRACT

In a self-propelled irrigation system, a wheeled support assembly is specifically adaptable for use in controlling the movement of an articulated or corner boom with respect to the rest of the system, the wheeled support assembly being characterized in that the wheels are self-aligning along a desired path of travel in accordance with the angular relationship between the corner boom and rest of the irrigation system. The invention has particular application to center pivot types of irrigation systems for the purpose of uniformly irrigating the corner areas of a generally rectangular field outside of the circular path of travel of the irrigation system.

15 Claims, 12 Drawing Figures

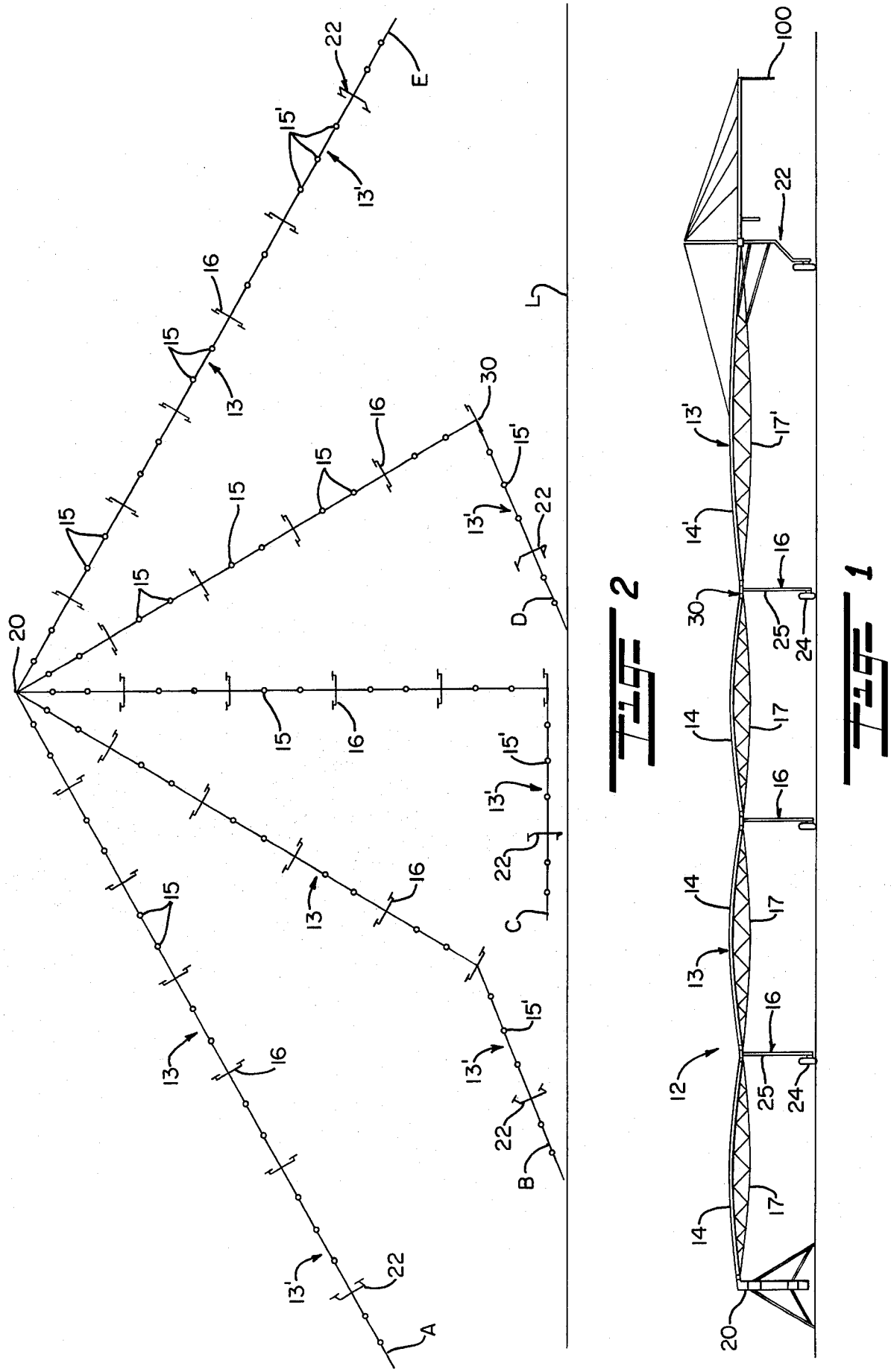

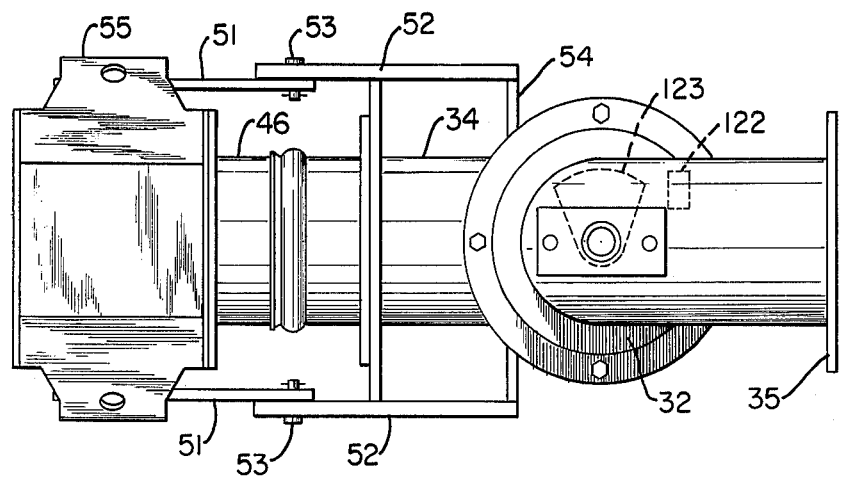
FIG. 4
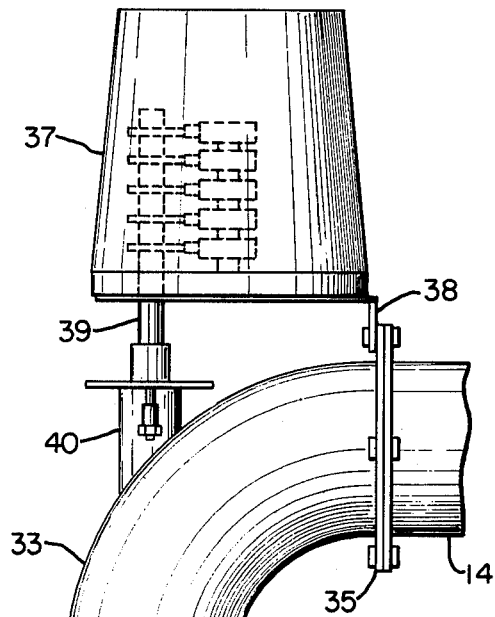
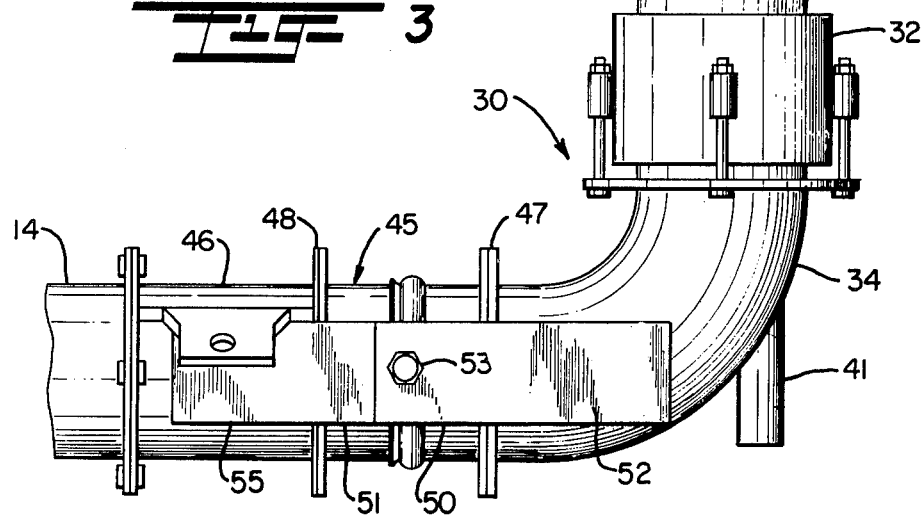
FIG. 3

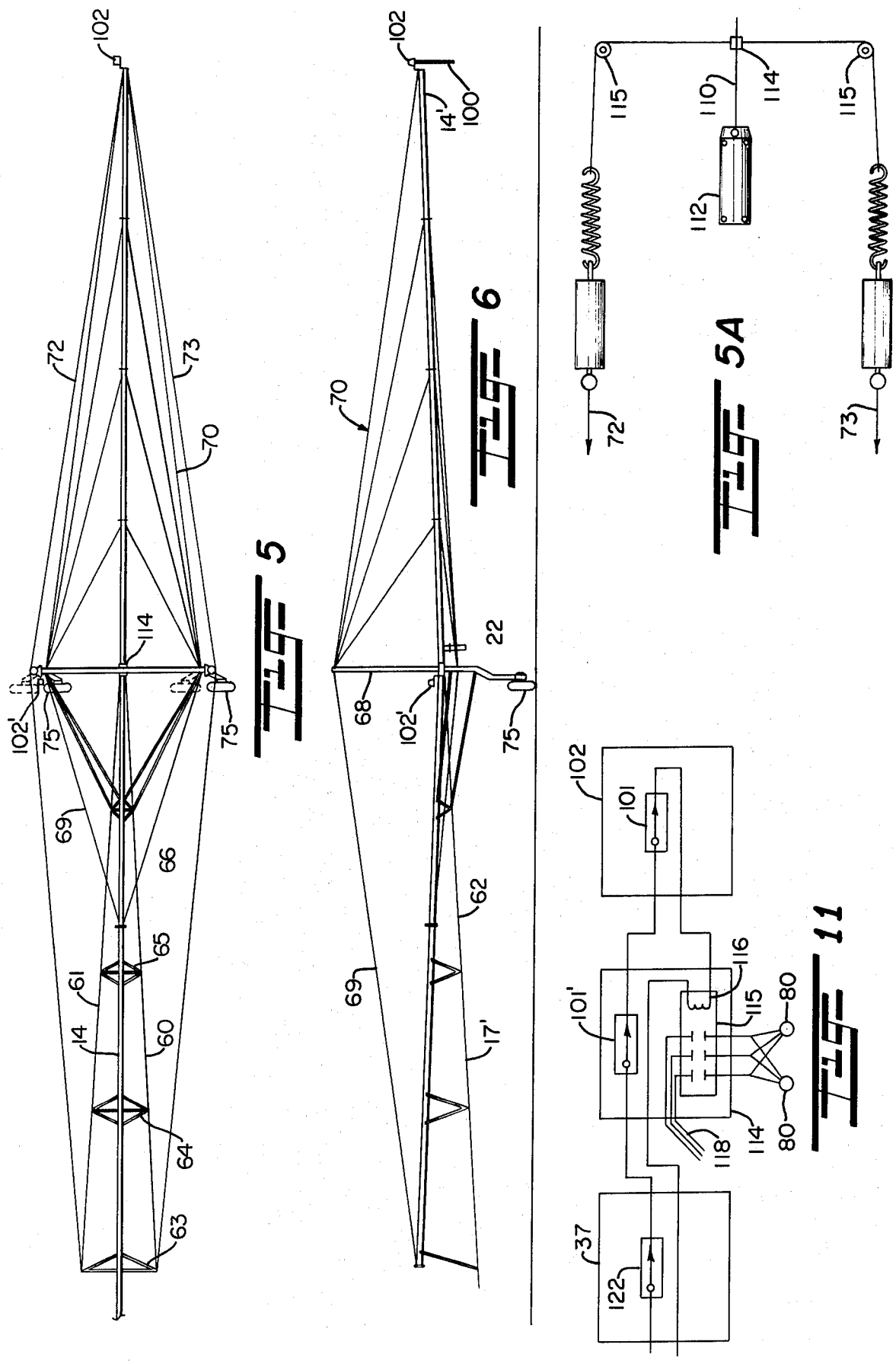

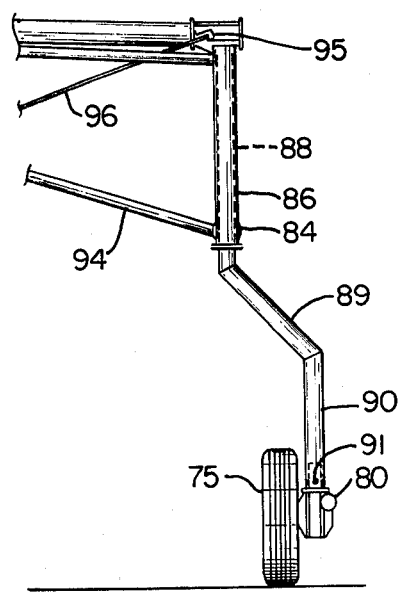
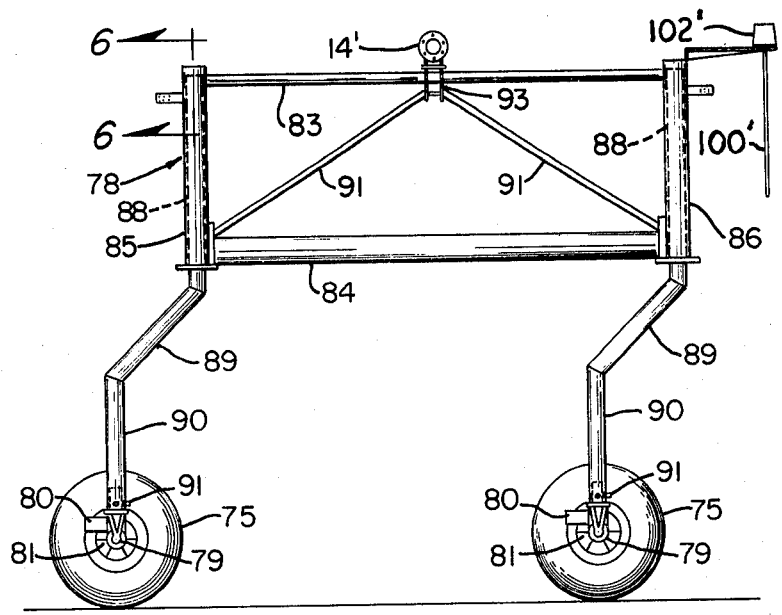
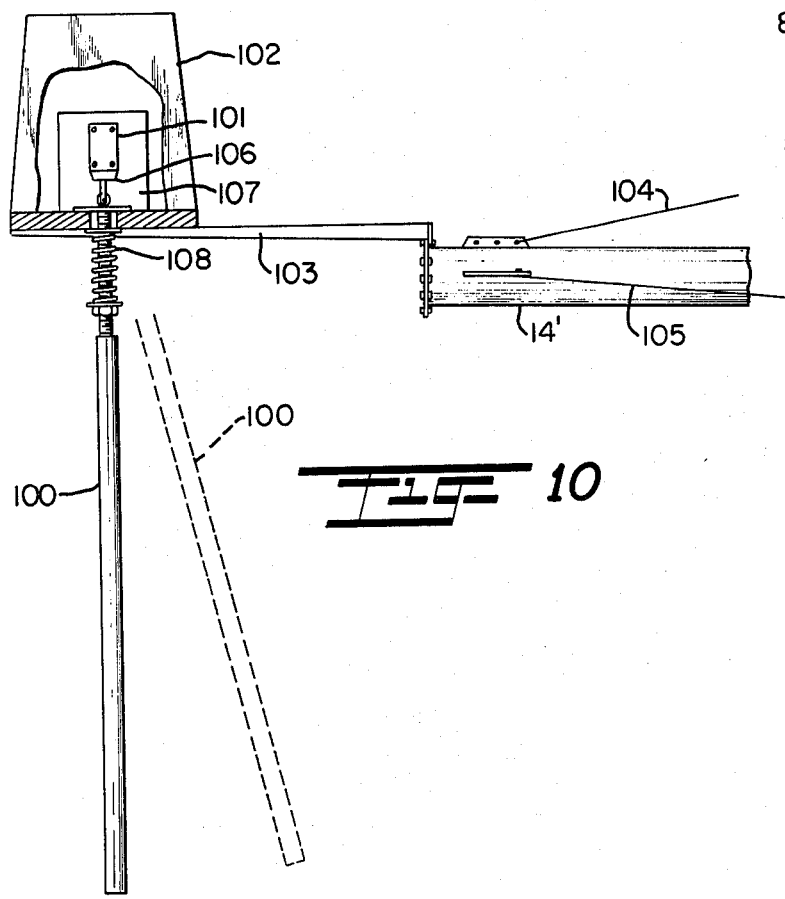
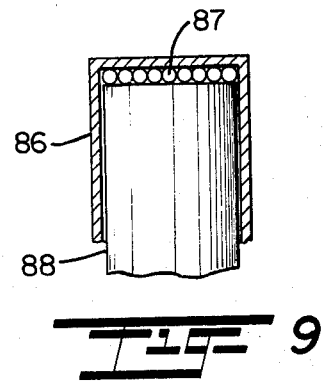

SELF-STEERABLE WHEEL ASSEMBLY FOR IRRIGATION SYSTEMS

This invention relates to irrigation systems; and more particularly relates to a novel and improved automated, self-propelled irrigation system capable of uniformly distributing water over large areas of ground.

BACKGROUND AND FIELD OF THE INVENTION

Self-propelled irrigation systems of the center pivot type have been in widespread use in the industry and are generally characterized by having an elongated boom rotatably attached at one end to a supply pipe located at the center of an area to be irrigated. The boom is supported by a plurality of wheeled support towers, each tower successively away from the center being driven at a greater rate of speed in order to maintain the boom in a substantially straight line as it rotates about the center. End or corner booms have also been proposed which can be articulated with respect to the main support towers in order to cover irregular areas of terrain beyond the periphery of the main support tower sections. Almost without exception such systems require fairly sophisticated controls, such as, by the utilization of buried wires or guide tracks which will cause the end boom to follow a predetermined path of travel around the outer periphery of the area to be irrigated; or programmed circuitry is employed to regulate the movement of the end boom relative to the main tower sections. Representative of such approaches taken in the prior art is U.S. Pat. No. 3,352,493 to Curtis which employs an end gun controlled by a solenoid, the solenoid being operated in accordance with the radial position of the water supply conduit. U.S. Pat. No. 3,608,826 to Reinke also employs an end gun with articulated pipe sections which are driven by wheeled support towers in a circular path and are controlled to cover irregular boundaries along the outer periphery of the area to be irrigated. U.S. Pat. No. 3,802,627 to Seckler employs a center pivot arrangement with an outer wheeled support tower or extension boom which is electrically controlled to advance independently of the main boom or tower sections to irrigate sections outside of the circular periphery traversed by the main support towers. Seckler accomplishes same through the utilization of a position angle encoder, such as, an analog-to-digital instrument in order to represent the position angle of the wheels of the outermost support tower with respect to an arbitrarily selected reference angle and, in combination with a stress switch, will energize a driving motor for the outermost tower.

Important to recognize in such systems with an articulated end boom assembly is that the wheeled supports must traverse a different arc or path of travel which imposes requirements not only in terms of relative speed of travel but steering of the wheels. In Seckler, for example, an independent type of a crankshaft steering mechanism is employed under the control of a steering motor for the steering wheels of the outermost tower for the extension boom. A similar approach to the same problem is disclosed in U.S. Pat. No. 3,902,668 to Daugherty in which the outermost boom support tower is pivotally connected to the end of the main water conduit and the wheels of the outermost tower are driven in a direction determined by an electrical sensor which is field-coupled to a conductor which establishes the path along which the end support tower is to advance. Again, however, the wheels of the outermost boom support tower are steered by a sensor which is attached to the boom and field-coupled to a buried electrical conductor. Other representative patents are U.S. Pat. Nos. 3,539,107 to Mitchell and 3,281,080 to Hogg for irrigation systems utilizing wheeled support towers.

It is desirable in accordance with the present invention to avoid the requirement for special steering mechanisms for the end boom assembly as well as the need for buried electrical wires or guide tracks which are expensive and costly to install and maintain as well as to overcome definite limitations with respect to satisfactory operation under varying conditions of use and types of irrigation systems employed.

SUMMARY OF THE INVENTION

It is therefore an object of the present invention to provide for a novel and improved end boom assembly for irrigation systems either of the center pivot or linear type which is capable of following irregular boundaries beyond the periphery of the main system.

Another object of the present invention is to provide for an end boom assembly for use in irrigation systems which is versatile, rugged, economical to manufacture, assemble and maintain in operation while being highly efficient and reliable in use.

It is a further object of the present invention to provide for an end boom assembly supported on self-steerable wheel or wheels which can be articulated with respect to the rest of the system and is capable of following an irregular path or course of travel independently of the path of movement of the rest of the system.

It is an additional object of the present invention to provide for a wheeled support assembly for an articulated boom in which the wheels are capable of automatically aligning themselves along the desired path of travel in accordance with the angular relationship between the end boom and main water conduit section; and further wherein the end boom assembly is specifically adaptable for use with irrigation systems of the center pivot type and is capable of uniformly distributing water over corner areas of a generally rectangular field outside of the outer circular periphery of the path of travel.

In accordance with the present invention, a self-steerable wheel assembly has been devised for use with irrigating apparatus of the type which is adapted to advance across a predetermined area and direct water uniformly along that area, particularly where the boundary of that area is unevenly spaced with respect to the path of advancement of the apparatus. Conventionally, the main or centermost portion of the apparatus is of the type including an elongated water supply conduit connected to a source of water, the conduit substantially traversing the area to be irrigated and having water distribution means associated with the conduit to distribute water evenly along that area. The wheel assembly of the present invention preferably supports an articulated section of the conduit at the outer distal end of the apparatus and includes at least one ground-engaging wheel with suspension means for each said wheel which is operative to suspend each wheel in journaled relation to the articulated section and in trailing, laterally offset relation to its journaled connection to the articulated section. Drive means may be provided for advancing each said wheel independently of the advancement of the boom member and is responsive to sensing of the proximity of the articulated section to the boundary to regulate the relative speed of advancement of the wheel with respect to the rest of the irrigation system. As a result of the laterally offset relationship of the wheel assembly to the articulated section the wheel assembly is capable of self-steering and of responding automatically to sensing of an obstruction to automatically assume an attitude tending to advance the articulated section in a direction which will follow the boundary sensed.

The features of the present invention may be best exemplified by reference to use of the self-steerable wheel assembly in a center pivot irrigation system which contains a water supply conduit mounted on radially spaced support towers wherein each support tower is self-propelled and in succession outwardly from the center pivot must be capable of advancing at a successively greater rate of speed in order to maintain a straight line relationship of the water conduit section. Radiating outwardly from the outermost support tower is an articulated conduit section, or a section which at least has a greater degree of controlled articulation than that between the support towers. The articulated conduit section is supported by a pair of wheels arranged in tandem and having a wheel suspension frame which serves to connect the tandem wheels in trailing, laterally offset, journaled relation to the articulated section, each wheel including an independent drive which is capable of driving the wheels at a rate of speed greater than that of the other wheeled support towers. The articulated water conduit section is provided with a sensor arm at its distal end which is engageable with a boundary guide positioned in elevated relation above the boundary of the area to be irrigated. Additional sensor means may be positioned to extend in a direction ahead of and behind the steerable wheel assembly in order to sense its movement into an obstruction ahead of the wheel assembly in either direction of travel. The motor drive for each wheel is responsive to movement of a sensor arm or other sensor means into engagement with the boundary guide or obstruction to deactivate the drive means and permit the articulated conduit section to pivot inwardly and lag further behind the main support towers until the boundary or obstruction is no longer sensed, after which the drive means is reactivated to drive the wheel assembly at its original rate.

In the steerable wheel assembly, each wheel is mounted at the lower end of a castor arm which is journaled to an upper support post to position each wheel in trailing, laterally offset relation to and radially inwardly of each respective wheel. This offset is preferably established by the angularity in the castor arms which may, for instance, extend at an angle exceeding 30° away from the support sleeve for connection into the wheel itself. Preferably, each wheel is independently driven by a constant speed drive motor into a universal coupling and is capable of driving the wheel at a speed on the order of 40% to 50% faster than the outermost end tower. It will become apparent that without any control over the motor drive for each wheel, each respective wheel would normally tend to advance the articulated conduit section ahead of the other support towers. Accordingly, another sensor is provided at the end of the main support towers to maintain a straight alignment between the boom member and articulated boom section and which will also intermittently deactivate the steerable wheel drive motors in order to maintain a straight alignment. More importantly, however, the wheels must assume a different attitude any time that the articulated section varies its angular relationship with respect to the main conduit sections. Otherwise, if the wheel assembly were permitted to remain fixed with respect to the articulated boom, undue stress and resistance to free movement of the wheel assembly would be generated. By virtue of the castored, laterally offset relation of the wheels to their connection into the articulated boom, the wheels are automatically self-correcting to assume an attitude or effectively counter-rotate themselves along a line corresponding to the new arc of movement required for the articulated section. Stated another way, the wheels circumscribe an arc about an effective radius which will change with variations in the angle between the articulated section and main sections as well as the relative speed of movement of the articulated section to the main section without necessity of external means of control over steering. The wheel assembly as described is further adaptable for use in reversible advancement of an articulated section by reversing the trailing relation of the wheels with respect to the articulated conduit section.

The above and other objects, advantages and features of the present invention will become more readily appreciated and understood from a consideration of the following detailed description of a preferred embodiment of the present invention when taken together with the accompanying drawings, in which:

BRIEF DESCRIPTION OF THE DRAWINGS

FIG. 1 is an elevational view of a preferred form of irrigation system in accordance with the present invention;

FIG. 2 is a schematic view illustrating the path of advancement followed by a center pivot irrigation system employing the self-steerable wheel assembly of the present invention along a boundary;

FIG. 3 is an enlarged, fragmentary side view in elevation of the hinge joint between the articulated span and main span of the present invention;

FIG. 4 is a plan view of the hinge joint illustrated in FIG. 3;

FIG. 5 is a plan view of the preferred form of articulated span in accordance with the present invention;

FIG. 5A is a plan view of the boundary sensor at the outer distal end of each span;

FIG. 6 is a front view of the preferred form of articulated span illustrated in FIG. 5;

FIG. 7 is an elevational view enlarged of a preferred form of wheel assembly in accordance with the present invention;

FIG. 8 is a side view enlarged of the wheel assembly illustrated in FIG. 7;

FIG. 9 is a fragmentary view in section of the journaled connection between one of the wheels and frame for the articulated span as shown in FIGS. 7 and 8;

FIG. 10 is a front view in detail of the preferred form of sensor arm employed on the articulated span; and FIG. 11 is a schematic circuit diagram of the control circuit employed between the sensor arm and steerable wheel motor drives of the present invention.

DETAILED DESCRIPTION OF THE PREFERRED EMBODIMENT

Referring to the drawings, and as a setting for the present invention, FIGS. 1 and 2 illustrate a center pivot irrigating system 12 having a main span 13 in the form of interconnected pipe or conduit sections 14 including sprinkler heads 15 at spaced intervals, the sections 14 being suspended between wheeled support towers 16 by truss assemblies 17. One end of the water supply conduit 14 is connected to a central water supply source in the form of a standpipe 20, and an articulated span 13' opposite to the stand pipe 20 also includes a water conduit section 14' and a truss assembly 17' which are supported by a self-steerable wheel assembly 22 in a manner to be hereinafter described in more detail. In accordance with conventional practice, the main span 13, as shown in FIG. 2, is comprised of three pipe sections 14 interconnected in such a way as to permit a limited degree of articulation between sections, and limit switches are typically employed to regulate the relative speed of movement between the towers. For instance, each support tower in succession outwardly from the center pivot is capable of advancing at a successively greater rate of speed in order to maintain a straight line relationship between the towers. A typical form of swivelled or articulated connection between the span 14 is illustrated in U.S. Pat. No. 3,606,160 to Bonds which discloses sensing devices employed at each tower and their use in combination with flexible boots or other types of articulated connections. Each of the support towers 16 also may be conventionally comprised of a pair of drive wheels 24 arranged in tandem and suspended by a common leg assembly 25 so as to support the main span at radially spaced intervals.

In FIG. 2, there is schematically illustrated the relative movement between the main span 13 and articulated span 13', specifically the ability of the articulated span 13' to progress from a straight line relationship with the main span as represented at A to a trailing relationship represented at B as it advances from a corner section of the square area along the intermediate portion of the boundary line between corners as represented at L and which for example may be defined by an elevated guide track in the form of a guide wire or fence. As the distance of the boundary line L from the center 20 is progressively reduced, the articulated span 13' is capable of progressively moving inwardly and, assuming that the main span 13 is dimensioned to be of a length just less than the least distance of the boundary line L away from the center, the articulated span 13' will move into a position at right angles to the main span as represented at C. Progressively, as it advances away from the point of least distance of the boundary from the center, the articulated span 13' will vary its angular relationship to the main span 13, as represented at D, and gradually return into a straight line relationship in traversing the next corner as represented at E. It will therefore be appreciated that the articulated span 13' must be capable of pivoting relative to the main span through an angle approximating 90° in advancing between the positions represented at A, C and E, as shown in FIG. 2.

To this end, a hinge assembly 30, as shown in FIGS. 3 and 4, is positioned between the main span 13 and articulated span 13', the hinge assembly including a swivel joint 32 in the form of a packing gland which serves to interconnect reverse-directed, 90° elbow pipes 33 and 34. The upper pipe section 33 is provided with a flange 35 for interconnection with a mating flange on the end of the conduit 14. A control box 37 is mounted on the upper pipe section 33 by a bracket 38 connected into the flange 35, and a downwardly projecting, rotatable shaft 39 extends through a sleeve 40 and intermediately through the pipe sections 33 and 34 to terminate in a lower end 41. Briefly, as the lower pipe section 34 articulates or pivots with respect to the upper pipe section 33, it will impart corresponding rotational movement to the shaft 41 and into a cam 42 in the control box.

The lower pipe section 34 is connected to straight pipe section 46 through a flexible joint coupler 45 which may suitably take the form of a boot composed of a rubber or rubber-like material having flanged couplings 47 and 48, respectively, at opposite ends of the coupler 45. A hinge joint 50 includes a pair of arms 51 and 52 on opposite sides of the coupler 45, each pair of arms pivotally interconnected as at 53 and the ends of the arms opposite to the pivotal connection being rigidly secured by brackets 54 and 55 to the pipe sections 34 and 46, respectively. In this way, the hinge joint will resist articulation between the pipe sections 34 and 46 in a horizontal direction while permitting freedom of movement in a vertical direction. In other words, any pivoting in a horizontal direction between the outer span 13' and the main span 13 is limited to that of the pipe sections 33 and 34 about the packing gland 32.

As illustrated in FIGS. 5 and 6, the articulated conduit 14' extends outwardly from its connection to the hinge joint assembly 30, and the truss assembly 17' is comprised of truss rods 60, 61 and 62, interconnected by generally diamondshaped cross-frames 63, 64, 65 and 66 at longitudinally spaced intervals. The frames 63 to 66 are preferably dimensioned to be of progressively increased then decreased size outwardly away from the hinge joint assembly so that the truss rods converge outwardly and terminate at a point intermediately above the wheeled assembly 22. A mast 68 projects upwardly from the wheeled assembly while inboard and outboard cables, collectively designated 69 and 70, respectively, are pretensioned to bow the conduit 14' into a cantilevered configuration away from the hinge joint 30, the cables interconnecting the conduit at spaced intervals to the mast and wheel assembly 22. Obstacle contact wires 72 and 73 extend the length of the articulated span from the hinge joint assembly 30 to its outermost distal end in outer spaced surrounding relation to the wheeled assembly 22.

Accordingly, in FIGS. 7 to 9, the self-steerable wheel assembly or castor tower 22 comprises a pair of wheels 75 mounted in tandem by a suspension frame 78 to conduit 14', each wheel having its wheel axle 79 driven by drive motor 80 through a speed reduction mechanism in a gear box 81. The suspension frame 78 has a main, generally rectangular frame portion defined by upper and lower horizontal rods 83 and 84 connected at opposite ends to vertically extending castor bearing sleeves 85 and 86. A rotating castor has an upper end 88 journaled in each bearing sleeve 85 and 86, an intermediate inclined or laterally offset portion 89 and a lower vertical end 90 to which each drive motor 80 is secured. Ball bearings 87 are positioned between the upper end 88 and closed end of each bearing sleeve 85 and 86 to permit free rotation of the castors within their respective sleeves 85 and 86, as shown in FIG. 9. Diagonal braces 91 extend between the lower ends of the bearings 85, 86 and a support bracket 93 which extends downwardly from connection to the conduit 14'. In turn, a brace 94 extends in a longitudinal direction and somewhat upwardly away from the lower frame member 84 into the frame 66 of the castored span, and an enlarged head 95 is secured to the end of another rod 96 which extends or inclines somewhat downwardly and inwardly from the conduit 14' at its point of connection into the frame 82. In this manner, the conduit 14' is supported directly above the intermediate portion of the frame 82 so as to be controlled in movement by advancement of the drive wheels 75. The conduit 14' is secured or braced in perpendicular relation to the length of the frame 82 by the diagonally extending cables 69 and 70 which extend between opposite upper ends of the frame 82 and longitudinally spaced points along the conduit 14 as well as the frame 66, as viewed in FIG. 5.

As further seen from FIG. 5, the rotating castors are connected into each drive wheel 75 such that the wheels 75 are laterally offset in trailing relation to their joints of journaled connection into the frame so long as they are positively driving the articulated span and maintaining the essentially straight line relationship to the main span as represented at A in FIG. 2, since the lower ends 90 of the castored bearings are rigidly secured to drive motors 80. However, if the drive motors are deactivated so as to permit the articulated span to lag behind the main span, the wheels 75 will be free to rotate about their journaled connections through the upper ends of the castor bearings into the bearing sleeves 85 and 86, for example, into the relationships as illustrated at B, C and D in FIG. 2. At all times the wheels will follow or circumscribe an arc about an effective radius which will vary with variations in the angle between the articulated span 13' and the main span 13. For instance, as the articulated span 13' increasingly lags behind the main span 13 in advancing through the angle from the straight line relationship represented at A to that represented at C the arc or radial distance of movement of the wheels 75 will be progressively decreased; and as the apparatus continues its advancement past the innermost point along the boundary line L the wheels will be intermittently activated to gradually increase their radius of movement in advancing through the positions shown at D and E until the articulated span returns into its straight line relationship to the main span 13.

From the foregoing, various sensing means may be utilized in cooperation with the drive motors in controlling the relative rate of advancement of the articulated span to that of the main span. In the preferred embodiment of the present invention, a highly simplified means is employed to control the operation of the drive motors 80 as shown in FIGS. 5, 5A, 6, 10 and 15 and takes the form of a sensor rod 100 depending downwardly from an electrical control circuit in a control box 102, the control box being mounted on an extension arm 103 projecting from the outer distal end of the conduit 14'. As shown in FIG. 10, the control circuit comprises a contact switch 101 electrically connected through electrical lead wires 104 and 105 into the drive motors 80. A contact arm 106 includes a roller 106' at its lower end normally bears against a wobble plate 107 positioned on the spring-loaded end 108 of the sensor rod 100. If the rod 100 is deflected in a direction away from its vertical disposition beneath the control circuit it will cause the wobble plate 107 to move away from the contact arm thereby breaking the circuit into the drive motors 80 and deactivating the drive wheels 75. For example, by erection of a guide wire or fence as represented at L in FIG. 2, the fence will deflect the sensor rod to deactivate the drive wheels 75 whenever the sensor rod moves into engagement with the fence L along the boundary line, as represented in FIG. 2, and the sensor rod 100 is deflected a predetermined angle or distance away from vertical. Correspondingly, a control switch 101' in a control box 102' is responsive to movement of a sensor arm 100' at the leading end of the wheeled assembly 22; and a second control circuit as described may be positioned at the trailing end of the wheeled assembly 22 for reverse operation as described. As shown in FIG. 5A, a sensor arm 110 is associated with a boundary switch 112 at the outer distal end of the span 13', the arm projecting radially outwardly into engagement with the outer common end 114 of the contact wires 72 and 73. The end wire 114 is trained over pulleys 115 into connected relation to the contact wires 72 and 73 so that when one of the contact wires 72 or 73 is depressed it will deflect the sensor arm 110 away from its normally extended disposition to break switch 112 and cause deactivation of the drive motors 80 through a separate breaker or safety circuit as long as either one of the contact wires is depressed or deflected at any point.

FIG. 11 schematically illustrates representative control switches of the control circuit for the articulated span and specifically to regulate the energization and de-energization of the drive motors 80 for the drive wheel 75. For instance, a control box 114 contains a series of control switches 115 connected in parallel and simultaneously opened and closed under the control of an energizing coil 116 to control the application of power through lines 118 into the drive motors 80. Thus, either of the control switches 101 or 101' is operative to control opening and closing of the switches 115 into the drive motors through the coil 116 under the conditions described. Similarly, another control switch 122 in the control box 37 for the hinge joint 30 is connected in series to the boundary switches 101 and 101' and is mechanically controlled by rotation of cam 123 at the upper end of the shaft 39 to open and close the switch 122. Specifically, in response to rotation or advancement of the articulated span 13' ahead of the main span 13; i.e., beyond the straight line relationship illustrated at A and E in FIG. 2, the cam will be rotated into a position disengaging the contact arm of the switch 122 so as to break the circuit into the drive motors 80 and maintain this position until the articulated span returns into its straight line relationship. It will be recognized that under normal advancement across the corners of a boundary the drive motors 80 will be periodically interrupted since they are designed to normally operate at a speed substantially faster than the main span. Although not shown, the control box 37 may include suitable controls to regulate the mass rate of flow of water through the conduit 14 into the articulated conduit 14' and thus regulate the relative amounts of water distributed through the outermost sprinkler heads 15' with respect to that directed through the main sprinkler heads 15. Again, the boundary switches 101 and 101' are regulated and mechanically controlled by the sensor rods 100 and 100'.

In practice, the self-steerable wheel assembly 22 is capable of advancing the conduit 14' of the articulated span at an independent rate of speed regulated only by the control switches as described so as to effectively irrigate areas which are unevenly spaced outside of the peripheral area covered by the main span. Preferably, the main span is a center pivot apparatus as described in which the elongated water supply conduit defines a water distribution means in cooperation with the spaced sprinkler heads 15 which will uniformly distribute water along the area covered by the main span. The articulated span 13' contains sprinkler heads 15' associated with the extension conduit 14' and where the flow capacity of water through the extension conduit 14' can be independently regulated in accordance with well-known practice according to the effective length or area being traversed by the articulated span. This articulated span 13' is supported by the self-steerable wheel assembly 22 and which includes at least one ground-engaging wheel with a castored connection into the suspension frame so as to advance in trailing laterally offset relation to its journaled connection into the frame. Each wheel is provided with drive means to advance the wheel independently of advancement of the main span and is responsive to sensing of the proximity of the articulated span to the boundary line L in regulating the relative speed of advancement of the wheel or wheels with respect to the rest of the irrigation system as described with reference to FIG. 2.

The trailing, laterally offset relationship of the wheel assembly 22 to its connection into the articulated span permits the wheels to be self-steering and to respond automatically to sensing of any obstruction in assuming an attitude which will tend to advance the articulated span in a direction following the boundary sensed. If it is desired to reverse the direction of advancement of the entire boom assembly about the center pivot 20, it is necessary merely to reverse the trailing relationship of the wheels 75 to the suspension frame. This may be done either by reversing the wheels so as to be disposed in laterally outwardly, trailing relation to the castored tower; or, as shown dotted in FIG. 5, the coupling of the motor housing into each post 90 may be effected by a removable pin or shaft 91 which is projected into aligned openings at the juncture between the gear box and post. In order to reverse the trailing relationship of the wheels to the upper suspension frame 78, the pins 91 may be removed to permit the wheels to be rotated through an angle approximating 90°, then repositioned into another set of aligned openings between the housing and each post 90 so as to be capable of assuming the dotted line position illustrated in FIG. 5. It should be emphasized also that the sensor arms 100 and 100' are adjustable in order to regulate the degree or angle of deflection required to deactivate the motors, this adjustment being made by the lower, threadedly adjustable nut or end stop for spring 108 as well as by threaded adjustment of the arm 100, as illustrated in FIG. 10. Essentially, the angle or distance of deflection required to deactivate the drive motors should be significantly less than the angular offset of the wheels 75 with respect to their journaled connections into the frame 78 so as to assure that the wheels will not become misaligned or advanced too far beyond the desired relation to the boundary.

It is therefore to be understood that various modifications and changes may be made in the construction and arrangement of parts comprising the preferred form of the present invention without departing from the spirit and scope thereof as defined by the appended claims.

I claim:

1. In irrigating apparatus adapted to advance across a predetermined area and to direct water uniformly along the area in which means are provided to establish the boundary of said area, said apparatus including an elongated water supply conduit connected to a source of water, means propelling said conduit to substantially traverse said area to be irrigated including boundary sensing means on said conduit for sensing the boundary of said area, and water distribution means associated with said conduit to distribute the water across said area, the improvement comprising:

a steerable wheel assembly adjacent to one end of said conduit having at least one laterally offset, steerable ground-engaging wheel rotatable about a horizontal axis, suspension means for each said wheel operative to establish journaled connection of each said wheel with respect to said conduit, each said wheel disposed in laterally offset relation to its journaled connection whereby to permit free rotation of each said wheel about a vertical axis through its journaled connection; and drive means for advancing each said steerable wheel at a predetermined rate of speed faster than the rate of advancement of said propelling means, said drive means responsive to said boundary sensing means to reduce the speed of each said wheel in order to maintain a uniform distance between said one end of said conduit and said boundary.

2. In irrigating apparatus according to claim 1, each said wheel disposed in trailing offset relation to its journaled connection with respect to said conduit.

3. In irrigating apparatus according to claim 2, said apparatus including a center pivot, said conduit having an articulated conduit section at said one end thereof supported by said wheel assembly, said propelling means advancing said conduit for traversal of an arc about said center pivot, said suspension means operative to support each said wheel such that each said wheel is freely rotatable to normally circumscribe an arc substantially about a radius from the center pivot which radius automatically undergoes changes with variations in angles of said articulated conduit section with respect to said conduit.

4. In irrigating apparatus according to claim 3, said drive means responsive to said boundary sensing means to regulate the speed of advancement of each said steerable wheel so as to maintain a predetermined distance between said articulated conduit section and said boundary.

5. In irrigating apparatus according to claim 1, each said steerable wheel being laterally offset in a radially inward direction toward said center pivot.

6. In irrigating apparatus according to claim 5, there being a pair of steerable wheels arranged in tandem.

7. In a self-propelled irrigating apparatus of the center pivot type in which a main span having an elongated water supply conduit is supported by a plurality of spaced, wheeled support towers and means are provided for advancing said wheeled support towers in a circular path across an area to be irrigated, the boundary of the area being unevenly spaced away from the center, the improvement comprising:

an articulated span including a conduit section at the outermost end support tower of said wheeled support towers for extension from said water supply conduit;

a castored wheel support assembly disposed outwardly of said outermost end support tower having a pair of laterally offset, steerable ground-engaging wheels arranged in tandem, suspension means for journaled connection of said wheels to said conduit section whereby to suspend said wheels from said conduit section in trailing, laterally offset relation to the axis of journaled connection to said conduit section, said suspension means operative to support each said wheel such that each said wheel is freely rotatable to normally circumscribe an arc substantially about a radius from the center pivot which radius automatically undergoes changes with variations in angles of said articulated conduit section with respect to said conduit; and drive means associated with each of said steerable wheels for normally advancing said wheels faster than said advancing means for said wheeled support towers and boundary sensing means associated with said drive means to reduce the speed of said drive means in order to maintain a predetermined distance between said articulated conduit section and said boundary.

8. In a self-propelled irrigating apparatus according to claim 7, said main span and articulated span collectively being of a length substantially corresponding to the radial distance from the center of the area to be irrigated to the outermost point of the boundary of the area away from the center and said main span being of a length less than the radial distance from the center of the area to be irrigated to the innermost point of the boundary away from the center.

9. In a self-propelled irrigating apparatus according to claim 8, including sensing means adjacent to an outer distal end of said articulated span operative to sense the boundary of the area to be irrigated, said boundary having an elevated guide track along the path of travel of said sensing means.

10. In a self-propelled irrigating apparatus according to claim 9, said drive means being de-energized in response to engagement of said sensing means with said elevated track and energized when said sensing means is not in contact with said elevated track.

11. In irrigating apparatus adapted to advance across a predetermined area and to direct water uniformly along the area in which means are provided to establish the boundary of said area and boundary sensing means for sensing the boundary of said area, the boundary of the area being unevenly spaced with respect to the path of advancement of said apparatus, said apparatus including a center pivot, an elongated water supply conduit connected to a source of water, a boom supporting said conduit for advancement around said center pivot to substantially traverse the area to be irrigated, and water distribution means associated with said conduit to distribute the water evenly across the area, the improvement comprising:

a steerable wheel assembly including an upper suspension frame mounted in fixed relation adjacent to one end of said conduit opposite to said pivot, a pair of laterally offset, self-steerable ground-engaging wheels, suspension means for each said wheel operative to establish journaled connection of each said wheel with respect to said suspension frame so that each said wheel is disposed in trailing laterally offset relation to its journaled connection to said suspension frame and is laterally offset in a radially inward direction toward said center pivot; and an articulated conduit section at one end of said conduit supported by said wheel assembly, and propelling means advancing said conduit for traversal of an arc about said center pivot, said suspension means operative to support each said wheel such that each said wheel is freely rotatable to circumscribe an arc about a radius from the center pivot which radius changes with variations in angles of said articulated conduit section with respect to said conduit said boundary sensing means disposed at the outer distal end of said articulated conduit section for sensing the outer boundary of said area, and said drive means responsive to said sensing means to regulate the relative speed of advancement of each said steerable wheel so as to maintain a predetermined spaced relation of the outer distal end of said articulated conduit section with respect to said boundary, and drive means for each said steerable wheel operative to advance each said wheel at a rate of speed faster than said propelling means for said conduit.

12. In irrigating apparatus according to claim 11, said sensing means including an elevated rod suspended from said conduit, a control switch associated with said rod and responsive to deflection of said rod to de-energize said drive means.

13. In a self-propelled irrigating apparatus of the center pivot type in which an elongated water supply conduit is supported by a plurality of spaced, wheeled support towers and means are provided for advancing said wheeled support towers in a circular path across an area to be irrigated, the boundary of the area being unevenly spaced away from the center, the improvement comprising:

an extension boom member hinged at the outermost end support tower of said wheeled support towers and at a point inwardly of the outer distal end of said extension boom member;

a castored wheel support assembly disposed intermediately between said outermost end support tower and said outer distal end of said extension boom member having a suspension frame connected to said extension boom member, a pair of laterally offset, steerable ground-engaging wheels arranged in tandem, suspension means for journaled connection of said wheels to said suspension frame whereby to suspend said wheels in trailing, laterally offset relation to the vertical axis of journaled connection to said suspension frame; and drive means associated with at least one of said steerable wheels for advancing said wheels independently of and at a rate faster than the rate of advancement of said propelling means for said wheeled support towers, sensing means in outer surrounding relation to said extension boom member operative to sense the boundary of the area to be irrigated, and said drive means responsive to said sensing means to control the rate of advancement of said steerable wheels relative to the rate of advancement of said wheeled support towers.

14. In a self-propelled irrigating apparatus according to claim 13, said sensing means including a rod suspended from said extension boom member and a control switch actuated in response to deflection of said rod to deactivate said drive means, said sensing means being adjustable to control the angle of deflection of said rod required to actuate said control switch.

15. In a self-propelled irrigating apparatus according to claim 13, said suspension means for said wheels operative to cause said wheels to follow an arc which will vary in accordance with differences in radial distance of the wheels from the center pivot so as to maintain the outer distal end of said extension boom at a constant distance from said outer boundary.

* * * * *